United States Patent
Rask

(10) Patent No.: US 10,801,471 B2
(45) Date of Patent: Oct. 13, 2020

(54) WIND TURBINE

(71) Applicant: Siemens Gamesa Renewable Energy A/S, Brande (DK)

(72) Inventor: Leif Christian Rask, Lem St. (DK)

(73) Assignee: SIEMENS GAMESA RENEWABLE ENERGY A/S (DK)

(*) Notice: Subject to any disclaimer, the term of this patent is extended or adjusted under 35 U.S.C. 154(b) by 101 days.

(21) Appl. No.: 16/114,938

(22) Filed: Aug. 28, 2018

(65) Prior Publication Data

US 2019/0072069 A1 Mar. 7, 2019

(30) Foreign Application Priority Data

Sep. 5, 2017 (EP) .................................... 17189329

(51) Int. Cl.
*F03D 7/02* (2006.01)
*F03D 80/50* (2016.01)

(52) U.S. Cl.
CPC ......... *F03D 7/0204* (2013.01); *F03D 7/0244* (2013.01); *F03D 80/50* (2016.05);
(Continued)

(58) Field of Classification Search
CPC ...... F03D 7/0204; F03D 80/50; F03D 7/0244; F03D 1/065; F05B 2260/902; F05B 2270/329; F05B 2240/14
See application file for complete search history.

(56) References Cited

U.S. PATENT DOCUMENTS 8,143,734 B2 * 3/2012 Steudel ................. F03D 7/0224
290/43
2009/0224543 A1 * 9/2009 Steudel ................. F03D 7/0224
290/44
(Continued)

FOREIGN PATENT DOCUMENTS

DE 102009009017 A1 8/2010
DE 102013101011 A1 * 8/2014 ........... F03D 7/0204
(Continued)

OTHER PUBLICATIONS

Peels, Translation of DE102013101011, 2013, eSpace, Translated 2020 (Year: 2013).*
(Continued)

*Primary Examiner* — Eldon T Brockman
(74) *Attorney, Agent, or Firm* — Schmeiser, Olsen & Watts LLP

(57) ABSTRACT

Wind turbine, including a tower, a nacelle which is rotatable connected to the tower, a yaw motor for rotating the nacelle relatively to the tower, a yaw brake which is configured to fix the nacelle relatively to the tower and which is configured to be brought from an open position into a brake position and vice versa, wherein the yaw brake is pre-tensioned into the brake position, a switch which is electrically connected to the yaw motor and the yaw brake and which is configured to be brought from an open state into a closed state and vice versa, wherein, when the switch is brought from the closed state into the open state a power supply to the yaw brake and the yaw motor is interrupted and the yaw brake goes into the brake position by releasing at least partially the pre-tension.

15 Claims, 2 Drawing Sheets

(52) U.S. Cl.
CPC ..... *F05B 2240/14* (2013.01); *F05B 2260/902* (2013.01); *F05B 2270/329* (2013.01)

(56) References Cited

U.S. PATENT DOCUMENTS

2011/0211961 A1 9/2011 Nies et al.
2016/0245258 A1 8/2016 Firkser et al.

FOREIGN PATENT DOCUMENTS

| DE | 102013101011 A1 | 8/2014 |
| DE | 102016213958 B3 | 8/2017 |
| JP | 2004232500 A | 8/2004 |
| WO | 2014118373 A1 | 8/2014 |

OTHER PUBLICATIONS

Electronics Hub, Types of Switches, 2015, Electronics Hub (Year: 2015).*
English Translation of Chinese Office Action for Application No. 201811004586.3 dated Oct. 15, 2019.

\* cited by examiner

WIND TURBINE

CROSS-REFERENCE TO RELATED APPLICATIONS

This application claims priority to European application No. EP17189329 having a filing date of Sep. 5, 2017, the entire contents of which are hereby incorporated by reference.

FIELD OF TECHNOLOGY

The following relates to a wind turbine.

BACKGROUND

Modern wind turbines comprise a tower and a nacelle which is rotatable connected to the tower. Further, a yaw motor may be provided for rotating the nacelle relatively to the tower around a height axis of the tower. Fixing the nacelle relatively to the tower may be useful in particular during maintenance and the like e.g. for satisfying security needs.

It is internally known to lower manually a toothed steel block from the nacelle such that it gets in inclination with a toothed yaw ring of the tower such that rotating of the nacelle relatively to the tower is prevented by means of a positive locking.

SUMMARY

An aspect relates to providing an improved wind turbine.

Accordingly, a wind turbine is provided. The wind turbine comprises a tower, a nacelle which is rotatable connected to the tower, a yaw motor for rotating the nacelle relatively to the tower, a yaw brake which is configured to fix the nacelle relatively to the tower and is configured to be brought from an open position into a brake position and vice versa, and wherein the yaw brake is pre-tensioned into the brake position. The wind turbine comprises a switch which is electrically connected to the yaw motor and the yaw brake and is configured to be brought from an open state into a closed state and vice versa, wherein, when the switch is brought from the closed state into the open state a power supply to the yaw brake and the yaw motor is interrupted and the yaw brake goes into the brake position by releasing at least partially the pre-tension.

One advantage of the wind turbine is that immediately after the yaw motor is switched off by means of merely one switch the yaw brake is activated automatically and without a need of electrical energy. Thus, manageability of the wind turbine in particular for maintenance personnel is improved. Further, the yaw brake is designed as safety system falling into the brake position in case of an interruption of the power supply since the yaw brake is pre-tensioned into the brake position. Furthermore, manual operations for activating the yaw brake are reduced or completely avoided. Such manual operations are often time-consuming since a positive locking is not possible in every position of the nacelle relatively to the tower. Further, such manual operations may be physically demanding.

"Wind turbine" presently refers to an apparatus converting the wind's kinetic energy into rotational energy, which may again be converted to electrical energy by the apparatus.

Preferably, the wind turbine comprises a hub rotatable connected to the nacelle e.g. by means of a bearing, in particular a friction bearing or a rolling bearing. The yaw motor may be provided at least partially inside the nacelle and/or the tower. It is understood that more than one yaw motor may be provided, namely two, three or more. Alternatively, the wind turbine comprises merely one yaw motor.

"Pre-tensioned" may mean that potential energy is stored in an element of the yaw brake and/or that a braking-force can be applied without need of further energy or a further energy storage. "Releasing at least partially the pre-tension" means that during braking the braking-force may be applied by means of the yaw brake and that such a braking-force may be applied by means of a rest pre-tension causing the braking-force.

"Electrically connected" means that electrical connection means between the electrically connected elements are provided. Preferably, a wiring between such two elements is provided.

Further, a blade may be provided which is connected to the hub. The wind turbine preferably comprises more than one blade. In particular, the wind turbine comprises three or more blades. Preferably, a separate adjustment device and a separate blade bearing relate to each blade. The blade bearing or each blade bearing preferably comprises a friction bearing or rolling contact bearing.

According to an embodiment, the switch comprises a first switch element and a second switch element which are electrically connected in series and each configured to interrupt the power supply to the yaw motor and the yaw brake.

Thus, two different possibilities are provided for interrupting the power supply to the yaw motor and the yaw brake. Each switch element may by brought from an open state into a closed state and vice versa.

According to a further embodiment, the wind turbine comprises a controlling device configured to control functionalities of the first switch element and the second switch element and configured to bring the first switch element and/or the second switch element into an open state when a functionality of the first switch element and/or the second switch element is affected.

"Functionality" means that an opening and/or closing of the switch elements is ensured. This has the advantage that a safety system is provided controlling malfunctions of both switch elements. The controlling device is configured to operate both switch elements. Preferably, the controlling device comprises or is a safety relay. The controlling device is preferably electrically connected to the first switch element and the second switch element.

According to a further embodiment, the wind turbine comprises three line conductors and a neutral wire each electrically connected to the yaw motor, wherein each switch element comprises four switch parts, and wherein one of the switch parts of the first switch element is connected in series with one of the switch parts of the second switch element respectively at each line conductor and at the neutral wire.

Preferably, the four switch parts of the first switch element are connected, in particular mechanically connected, to each other such that the four switch parts are operable or switchable together. Preferably, the four switch parts of the second switch element are connected, in particular mechanically connected, to each other such that the four switch parts are also operable or switchable together. In particular the three line conductors and a neutral wire are connected to a Y-connection (or star-connection) of the yaw motor. It is understood that the yaw motor may be used merely as Y-connection or delta-connection or alternating. Alternatively a single-phase alternating current yaw motor or a direct current yaw motor may be provided. Preferably, a converter and/or three-phase transformer and/or a three-phase transformer-rectifier and the like is interconnected between the yaw motor and the three line conductors and a neutral wire. Thus, the single-phase alternating current yaw motor or the direct current yaw motor may be energized by means of a three-phase power system since the power supply to the yaw motor may be adjusted. Alternatively, an alternating current power system may be provided to which the yaw motor is directly or indirectly electrically connected.

According to a further embodiment, the yaw brake is electrically connected to at least one or merely one of the line conductors and the neutral wire.

Preferably, a first wire of the yaw brake is electrically connected to the neutral wire and connected or plugged between the yaw motor and the switch part of the second switch element. Preferably, a second wire of the yaw brake is electrically connected to one of the three line conductors and connected or plugged between the yaw motor and the switch part of the second switch element.

According to a further embodiment, the wind turbine comprises a main switch electrically connected to the controlling device and configured to be brought from a closed state into an open state and vice versa, wherein the controlling device is configured to bring the first switch element and/or the second switch element from the closed state into the open state when the main switch is brought from the closed state into the open state.

Thus, the main switch operates the controlling device and indirectly the first switch element and the second switch element.

According to a further embodiment, the main switch is lockable in the open state.

"Lockable" means that the switch is configured to be locked by means of locking means in the open state. Preferably, such a locking may be released only with a key device. This has the advantage that the main switch may be hold safely in the open state such that maintenance personnel can work safely at the wind turbine. Preferably, the main switch is also lockable in the closed state.

According to a further embodiment, the wind turbine comprises a padlock configured to lock the main switch in the open state.

Thus, a practical solution is provided for locking the switch in the open state and accidental switching may be avoided. Preferably, the padlock is also configured to lock the switch in the closed state. It is understood that instead of a padlock every type of lock can be used.

According to a further embodiment, the main switch comprises a rotary knob configured to bring the main switch from the open state into the closed state and vice versa.

Thus, the main switch can be operated manually from the maintenance personnel. Alternatively, the main switch may comprise a button, in particular a press-button, configured to bring the main switch from the open state into the closed state and vice versa.

According to a further embodiment, the yaw brake comprises a spring element configured to be pre-tensioned into the braking position.

This has the advantage that a reliable and durable energy storage is provided. It is understood that more than one spring element may be used, e.g. two, three, four, five, six or more. Preferably, the spring element comprises or is a cup spring, a coil spring and/or a leaf spring. Preferably, the yaw brake is provided as a spring activated brake.

According to a further embodiment, the yaw brake comprises an actuator configured to bring the yaw brake into the open position and simultaneously to pre-tension the yaw-brake into the brake position.

Thus, the actuator must overcome e.g. a spring-force to pre-tension the yaw-brake. Preferably, the actuator comprises a hydraulic actuator and/or an electric motor. Preferably, the actuator is powered by means of the first wire connected to the neutral wire and the second wire connected to one of the three line conductors.

According to a further embodiment, the yaw brake comprises at least two friction elements interacting with each other in the brake position of the yaw brake.

Preferably, the yaw brake is braking by means of friction of the friction elements. Preferably, at least one the friction elements comprises a friction lining.

According to a further embodiment, the yaw motor comprises a stator and a rotor, wherein one of the at least two friction elements is mechanically connected directly or indirectly to the rotor and the other of the at least two friction elements is mechanically connected directly or indirectly to the stator.

"Mechanically connected directly or indirectly" means a stiff connection or a connection by means of a transmission. Preferably, the yaw brake comprises a braking disk and at least one brake shoe, wherein one of the two friction elements is comprised by the braking disk and the other of the two friction elements is comprised by the at least one brake shoe. It is understood, that more than two friction elements being a friction pair may be provided. In particular two, three, four, five or more friction pairs may be provided.

According to a further embodiment, the wind turbine comprises a current source, a voltage source and/or other devices configured to provide electrical energy for the yaw motor and the yaw brake.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, within:

In the Figures, like reference numerals designate like or functionally equivalent elements, unless otherwise indicated.

DETAILED DESCRIPTION

Figure 1:
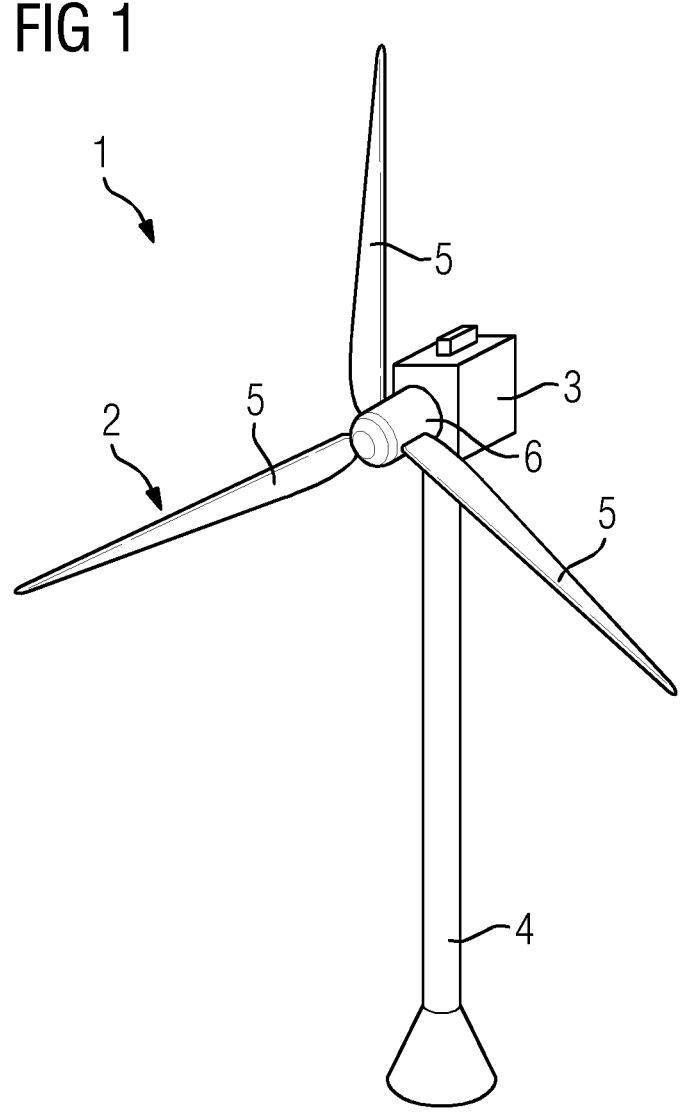
FIG. 1 is a perspective view of a wind turbine according to one embodiment.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1. The nacelle 3 is rotatable connected to the tower 4.

The rotor 2 comprises three blades 5. The blades 5 are connected directly or indirectly to a hub 6 of the wind turbine 1. Rotors 2 of this kind may have diameters ranging from, for example, 30 to 160 meters or even more. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
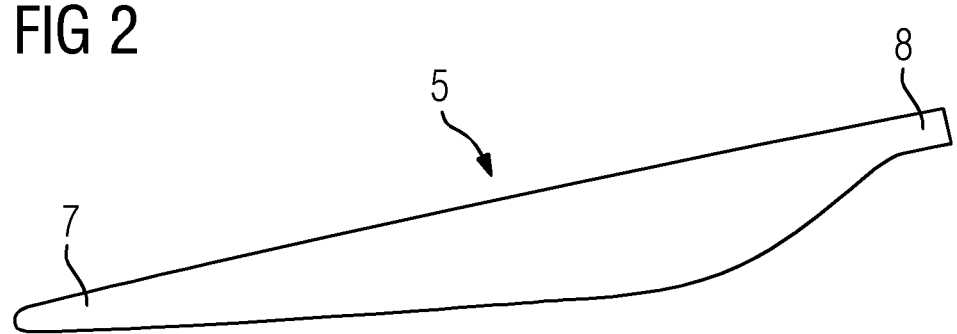
FIG. 2 is a perspective view of a wind turbine rotor blade according to one embodiment.

FIG. 2 shows a blade 5 according to one embodiment.

The blade 5 comprises an aerodynamically designed portion 7, which is shaped for optimum exploration of the wind energy and a blade root 8 for connecting the blade to the hub 6.

Figure 3:
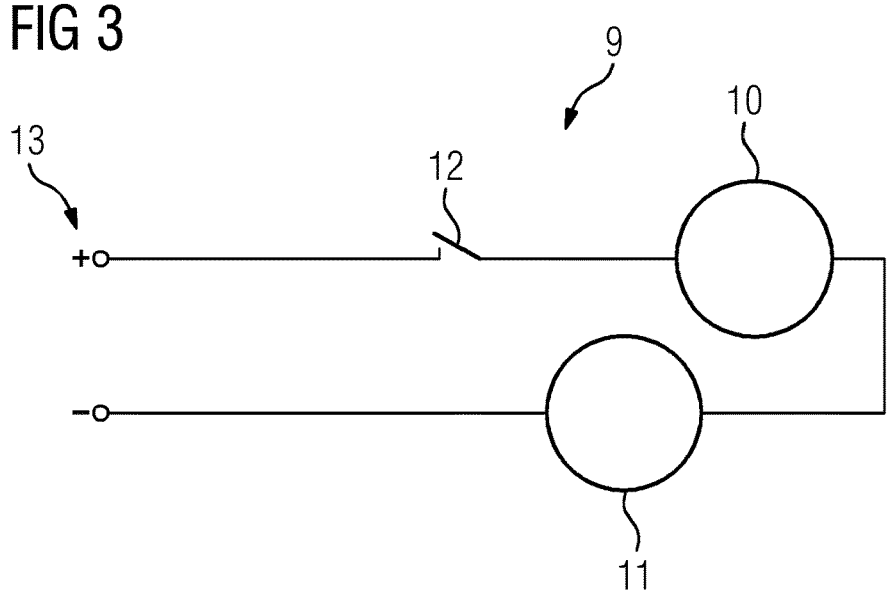
FIG. 3 shows a schematic circuit diagram for a yaw motor and a yaw brake of the wind turbine according to one embodiment.

FIG. 3 shows a schematic circuit diagram for a yaw motor and a yaw brake.

The circuit diagram 9 comprises a yaw motor 10 for rotating the nacelle 3 relatively to the tower 4. The yaw motor 10 may be an alternating current motor, a three-phase alternating current motor or a direct current motor. Alternatively, the yaw motor 10 may comprise a hydraulic actuator which may comprise a hydraulic pump (not shown). Further, a yaw brake 11 is provided which is configured to fix the nacelle 3 relatively to the tower 4 and which is configured to be brought from an open position into a brake position and vice versa. The yaw brake 11 is pre-tensioned into the brake position.

Further, a switch 12 is provided which is electrically connected to the yaw motor 10 and the yaw brake 11. The switch 12 is configured to be brought from an open state into a closed state and vice versa. When the switch 12 is brought from the closed state into the open state a power supply to the yaw brake 11 and the yaw motor 10 is interrupted and the yaw brake 11 goes into the brake position by releasing at least partially the pre-tension. Further, a power supply 13 is shown in the circuit diagram 9. The power supply 13 may be an alternating current power system, a three-phase power system or a direct current power system. Further, the power supply 13 may comprise a current source or a voltage source which may be provided inside or outside the wind turbine 1. In particular, the current source or the voltage source may be part of an electric supply network energizing a plurality of wind turbines or other electricity consumer.

Figure 4:
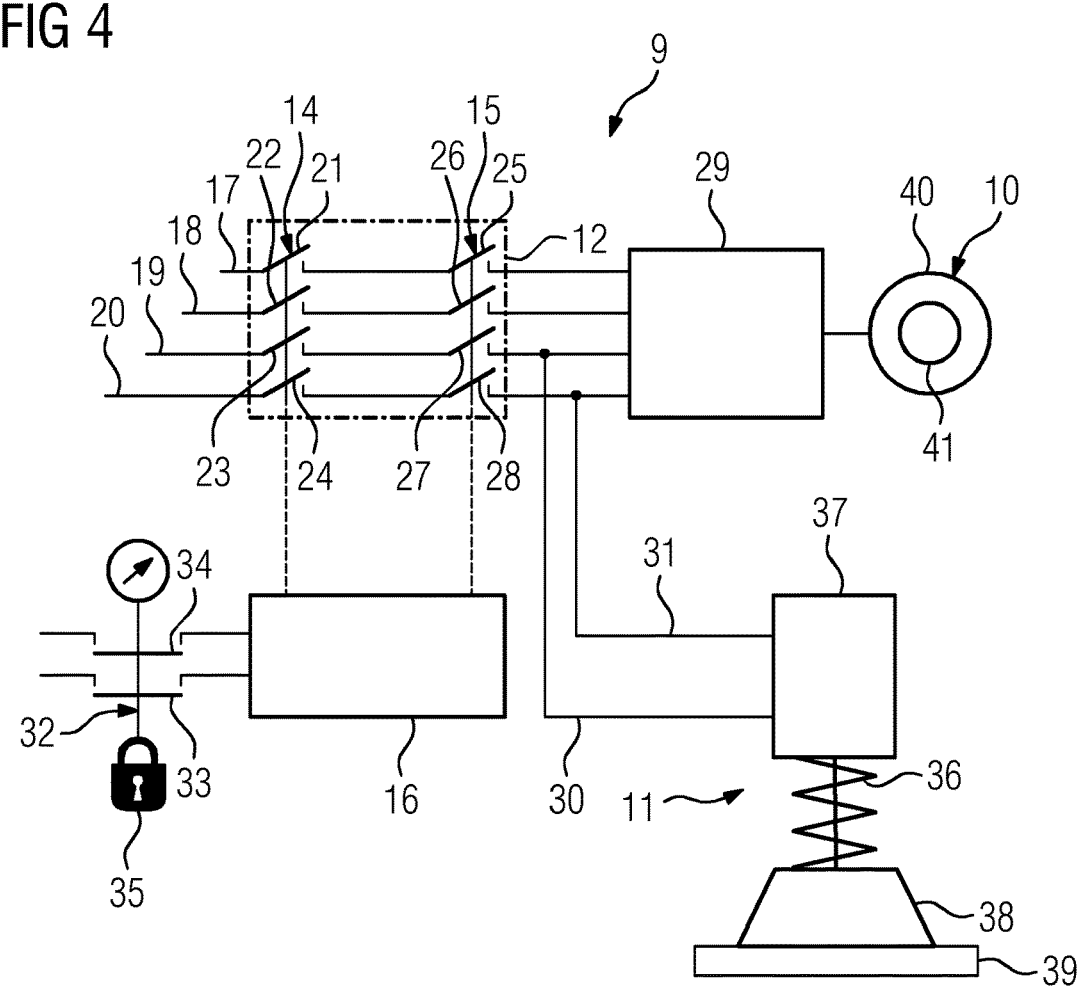
FIG. 4 shows a schematic circuit diagram for the yaw motor and the yaw brake according to a further embodiment.

FIG. 4 shows a schematic circuit diagram 9 for the yaw motor 10 and the yaw brake 11 according to a further embodiment.

The switch 12 comprises two switch elements 14, 15 electrically connected in series and each configured to interrupt the power supply to the yaw motor 10 and the yaw brake 11. Further, a controlling device 16 is provided. The controlling device 16 is configured to control functionalities of the switch elements 14, 15 and is configured to bring the switch element 14 (also referred as first switch element) and/or the switch element 15 (also referred as second switch element) into an open state when a functionality of the switch element 14 and/or the switch element 15 is affected. Preferably, the controlling device 16 comprises or is a safety relay.

Furthermore, three line conductors 17, 18, 19 and a neutral wire 20 each electrically connected to the yaw motor 10 are provided. Each switch element 14, 15 comprises four switch parts 21, 22, 23, 24, 25, 26, 27, 28 each arranged as a switch having an open state and a closed state. One of the switch parts 21, 22, 23, 24 of the switch element 14 is connected in series with one of the switch parts 25, 26, 27, 28 of the switch element 15 respectively at each line conductor 17, 18, 19 and at the neutral wire 20. Preferably, the switch parts 21, 22, 23, 24, 25, 26, 27, 28 are arranged as contactors.

The line conductors 17, 18, 19 and at the neutral wire 20 preferably are further connected to a conversation unit 29 which is further connected to the yaw motor 10. In this case, the line conductors 17, 18, 19 and at the neutral wire 20 are electrically connected to the yaw motor 10 by means of the conversation unit 29. Preferably, the conversation unit 29 comprises a converter and/or transformer, in particular a three-phase transformer, and/or a transformer-rectifier, in particular a three-phase transformer-rectifier. Thus, every type of electric motor, e.g. single-phase alternating current motor, three-phase alternating current motor, direct current motor and the like, may be energized by means of a three-phase power system since the power supply to the yaw motor 10 may be adjusted.

The yaw brake 11 comprises a wire 30 (also referred as first wire) which is electrically connected to the line conductor 19 and a wire 31 (also referred as second wire) which is electrically connected to the neutral wire 20 for energizing the yaw brake 11.

Further, a main switch 32 is provided which is electrically connected to the controlling device 16 and configured to be brought from a closed state into an open state and vice versa. The controlling device 16 is configured to bring the switch element 14 and/or the switch element 15 from the closed state into the open state when the main switch 32 is brought from the closed state into the open state. The main switch 32 may comprise two breakers 33, 34 which can be opened for interrupting a current supply to the controlling device 16 and thus activating the controlling device 16 for operating the switch elements 14, 15. Preferably, the four switch parts 21, 22, 23, 24 of the switch element 14 are connected, in particular mechanically connected, to each other such that the four switch parts 21, 22, 23, 24 are operable or switchable together. Preferably, the four switch parts 25, 26, 27, 28 of the switch element 15 are connected, in particular mechanically connected, to each other such that the four switch parts 25, 26, 27, 28 are also operable or switchable together.

Preferably, the main switch 32 is lockable in the open state by means of a padlock 35. Thus, the padlock 35 is configured to lock the main switch 32 in the open state. Preferably, main switch 32 comprises a rotary knob configured to bring the main switch 32 from the open state into the closed state and vice versa. It is understood that a rotatory knob may be operated by a handcraft e.g. of a maintenance personnel.

Furthermore, the yaw brake 11 comprises a spring element 36 configured to be pre-tensioned into the braking position and an actuator 37 configured to bring the yaw brake 11 into the open position and simultaneously to pre-tension the yaw brake 11 respectively the spring element 36 into the brake position.

In particular, the yaw brake 11 may comprise at least two friction elements 38, 39 interacting with each other in the brake position (as schematically shown in FIG. 4) of the yaw brake 11.

The yaw motor 11 comprises a stator 40 and a rotor 41, wherein one of the at least two friction elements 38, 39 is mechanically connected directly or indirectly to the rotor 41 and the other of the at least two friction elements 38, 39 is mechanically connected directly or indirectly to the stator 40. Thus, stator 40 and rotor 41 of the yaw motor 10 may be blocked.

The principal of locking the nacelle 3 relatively to the tower 4 is simplified for maintenance personnel. First, the main switch 32 should be operated by the handcraft, in particular after releasing the padlock 35. Both breakers 33, 34 are now opened. Accordingly, the controlling device 16 opens switch element 14 and switch element 15 respectively switch parts 21, 22, 23, 24, 25, 26, 27, 28 by operating the same. Thus, the power supply to the yaw motor 10 is interrupted and the yaw brake 11 is activated. Therefore, release of the yaw brake 11 and activation of the yaw motor 10 is now prevented and the nacelle 3 cannot yaw. It is understood that a plurality of yaw motors may be connected instead of one yaw motor 10 as shown in FIGS. 3 and 4.

Although the present invention has been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising a tower, a nacelle which is rotatably connected to the tower, a yaw motor for rotating the nacelle relatively to the tower, a yaw brake which is configured to fix the nacelle relatively to the tower and which is configured to be brought from an open position into a brake position and vice versa, wherein the yaw brake is pre-tensioned into the brake position, a switch which is electrically connected to the yaw motor and the yaw brake and which is configured to be brought from an open state into a closed state and vice versa, wherein, when the switch is brought from the closed state into the open state a power supply to the yaw brake and the yaw motor is interrupted and the yaw brake goes into the brake position by releasing at least partially the pre-tension.

2. The wind turbine according to claim 1, wherein the switch comprises a first switch element and a second switch element which are electrically connected in series and each configured to interrupt the power supply to the yaw motor and the yaw brake.

3. The wind turbine according to claim 2, further comprising a controlling device which is configured to control functionalities of the first switch element and the second switch element and which is configured to bring the first switch element and/or the second switch element into an open state when a functionality of the first switch element and/or the second switch element is affected.

4. The wind turbine according to claim 2, further comprising three line conductors and a neutral wire each electrically connected to the yaw motor, wherein each switch element comprises four switch parts, and wherein one of the switch parts of the first switch element is connected in series with one of the switch parts of the second switch element respectively at each line conductor and at the neutral wire.

5. The wind turbine according to claim 4, wherein the yaw brake is electrically connected to at least one or merely one of the line conductors and the neutral wire.

6. The wind turbine according to claim 3, further comprising a main switch which is electrically connected to the controlling device and which is configured to be brought from a closed state into an open state and vice versa, wherein the controlling device is configured to bring the first switch element and/or the second switch element from the closed state into the open state when the main switch is brought from the closed state into the open state.

7. The wind turbine according to claim 6, wherein the main switch is lockable in the open state.

8. The wind turbine according to claim 7, further comprising a padlock which is configured to lock the main switch in the open state.

9. The wind turbine according to claim 6, wherein the main switch comprises a rotary knob which is configured to bring the main switch from the open state into the closed state and vice versa.

10. The wind turbine according to claim 9, wherein the yaw brake comprises a spring element which is configured to be pre-tensioned into the braking position.

11. The wind turbine according to claim 1, wherein the yaw brake comprises an actuator which is configured to bring the yaw brake into the open position and simultaneously to pre-tension the yaw-brake into the brake position.

12. The wind turbine according to claim 1, wherein the yaw brake comprises at least two friction elements which are interacting with each other in the brake position of the yaw brake.

13. The wind turbine according to claim 12, wherein the yaw motor comprises a stator and a rotor, and wherein one of the at least two friction elements is mechanically connected directly or indirectly to the rotor and the other of the at least two friction elements is mechanically connected directly or indirectly to the stator.

14. The wind turbine according to claim 1, further comprising the power supply, wherein the power supply is configured to provide electrical energy for the yaw motor and the yaw brake.

15. The wind turbine according to claim 14, wherein the power supply is at least one of a voltage source, a current source, an alternating current power system, a three-phase power system, and a direct current power system.

* * * * *